US007149592B2

(12) United States Patent
Chin et al.

(10) Patent No.: US 7,149,592 B2
(45) Date of Patent: Dec. 12, 2006

(54) LINKING INTERNET DOCUMENTS WITH COMPRESSED AUDIO FILES

(75) Inventors: Chinn Chin, Cupertino, CA (US); Shahab Layeghi, Redwood City, CA (US); Fahri Surucu, Fremont, CA (US)

(73) Assignee: Intervideo, Inc., Fremont, CA (US)

( * ) Notice: Subject to any disclaimer, the term of this patent is extended or adjusted under 35 U.S.C. 154(b) by 771 days.

(21) Appl. No.: 09/790,032

(22) Filed: Feb. 20, 2001

(65) Prior Publication Data

US 2001/0039495 A1 Nov. 8, 2001

Related U.S. Application Data

(60) Provisional application No. 60/183,765, filed on Feb. 18, 2000.

(51) Int. Cl.
*G06F 17/00* (2006.01)
*G10L 21/00* (2006.01)

(52) U.S. Cl. ......................... 700/94; 704/500; 704/503

(58) Field of Classification Search .................. 700/94; 380/236, 237, 238; 360/18; 370/493, 494, 370/495; 369/4; 375/140; 704/500, 501, 704/502; 713/176

See application file for complete search history.

(56) References Cited

U.S. PATENT DOCUMENTS

| | | | | |
|---|---|---|---|---|
| 5,450,490 | A * | 9/1995 | Jensen et al. | 380/253 |
| 5,774,666 | A * | 6/1998 | Portuesi | 725/110 |
| 5,778,181 | A * | 7/1998 | Hidary et al. | 725/110 |
| 6,006,241 | A * | 12/1999 | Purnaveja et al. | 715/512 |
| 6,243,481 | B1 * | 6/2001 | Tao | 382/100 |
| 6,286,036 | B1 * | 9/2001 | Rhoads | 709/217 |
| 6,449,653 | B1 * | 9/2002 | Klemets et al. | 370/493 |

* cited by examiner

*Primary Examiner*—Xu Mei
(74) *Attorney, Agent, or Firm*—Rosenberg, Klein & Lee

(57) ABSTRACT

A method for embedding a non-audio file into a compressed audio file is disclosed. The disclosed method is capable of decoding and constructing previously encoded audio files with embedded non-audio information. The method of the present invention also includes steps for embedding the non-audio information at the proper time within the compressed audio file, wherein the decoded non-audio information can link to an Internet document for viewing during playback of the decoded audio source.

12 Claims, 2 Drawing Sheets

Decoding text characters from mp3 data

LINKING INTERNET DOCUMENTS WITH COMPRESSED AUDIO FILES

CROSS REFERENCES TO RELATED APPLICATIONS

This application claims the benefit of U.S. Provisional Application 60/183,765 filed Feb. 18, 2000.

FIELD OF THE INVENTION

The present invention generally relates to compressed files and, more particularly, to linking files of one type with compressed files of another type.

BACKGROUND OF THE INVENTION

The process of compressing an audio source, such as voice or music, and storing it digitally into a file is conventionally known. An encoder is conventionally employed to compress the audio file. A user connected to the Internet can download encoded compressed files, such as files in the MP3 format, run software to decode the file and listen to the audio source. The MP3 format is well known in the art and refers to Layer 3 audio files of the Motion Picture Experts Group (MPEG) international standard for representation, compression, and decompression of motion pictures and associated audio on digital media. Conventionally, a decoder is employed to decode the encoded digital audio file.

A drawback of conventional methods is that compressed audio files do not include information and links to Internet documents that can be viewed during audio playback. Conventional methods require the listener of the decoded audio file to manually make any such links to Internet documents.

What is needed is the embedding of Internet links or other information at the proper time in the compressed audio file so that, upon decoding the audio file, a listener of the audio file could view information or be linked to a document, for example, an Internet document.

SUMMARY OF THE INVENTION

The present invention is directed to an encoder that is used to encode files to be transmitted, for example, over the Internet, by linking documents with compressed audio files. In one embodiment, the encoded transmitted document is provided by embedding the addresses of the Internet documents along with corresponding timing information into the compressed file. The timing information indicates when the compressed information should appear during playback of the compressed files.

In a preferred embodiment, the encoder will use the timing information and embed the corresponding displayable information, such as the Internet address or other displayable data at a selected time within the audio file.

The present invention is a method for encoding non-audio information with a compressed audio file, comprising the steps of receiving a non compressed or compressed audio files; receiving at least one non-audio data file; and encoding in the compressed audio file each non-audio data file at a selected point in the audio stream such that each non-audio data file is reproducable by a decoder at a selected time interval along with the audio within the compressed audio file.

DETAILED DESCRIPTION OF THE INVENTION

In an embodiment of the invention, to link documents (i.e. Internet documents) with compressed audio files such as ".MP3" files, the addresses of the Internet documents along with the corresponding timing information are embedded into the compressed files. The timing information indicates when the linked document, or other displayable information, should appear during the playback of such files. When a file encoded by the method of the present invention is played back in a decoder which is aware (i.e. can detect) such an encoding scheme, it extracts the embedded information while decompressing the audio information and uses the embedded information to reference the documents on the Internet.

An example of the data that can be embedded according to the present invention is as follows:

```
{
1.0: www.intervideo.com
10.2: www.intervideo.com/mymusic/info1.htm
}
```

The number on the left indicates the timing information. For the preferred embodiment, the audio compressor unit of the encoder uses these timing values to embed the corresponding information in the right moment of time. The decoder extracts this information and executes a proper action. The embedded information may also represent displayable information that can be displayed. Preferably, the information is a web page link such that the decoder can open the corresponding web page or web command at the specified times. For the example provided above, at times 1.0 seconds and 10.2 seconds.

In another embodiment, the encoder embeds the timing information along with the corresponding data. As described above, the data can be the addresses of Internet documents or other text information.

The method of the present invention can be performed in various systems including a computer system or other device that includes a central processing unit and a display. Preferably, the system has the capability to connect to the Internet.

Figure 1:
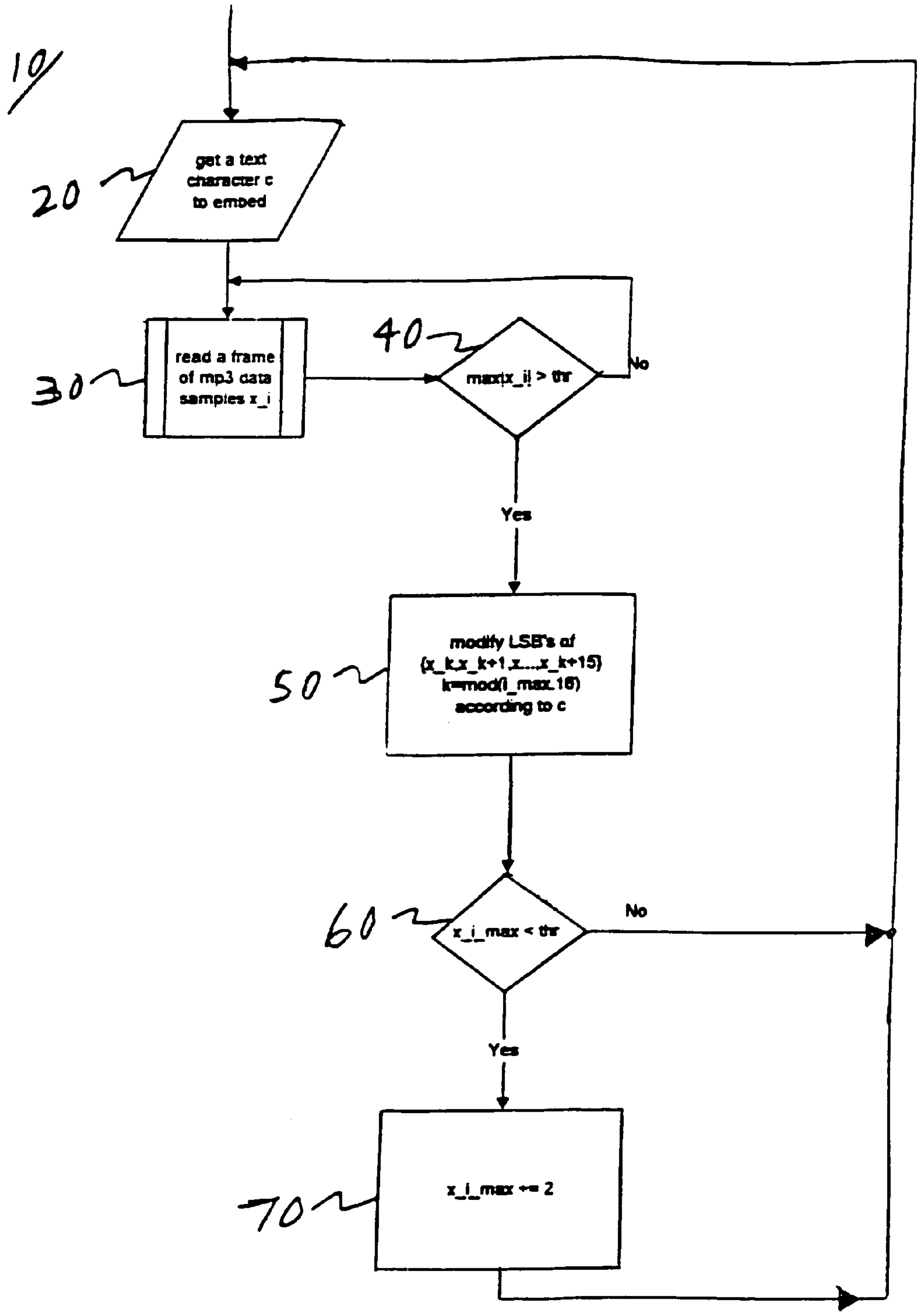
FIG. 1 is a flow chart illustrating of the process steps of the encoder algorithm according to an exemplary embodiment the present invention.

FIG. 1 is a flow chart illustrating the process steps of the encoder method algorithm 10 according to an exemplary embodiment the present invention.

Referring to the exemplary embodiment in FIG. 1, in Step 20 the encoding process begins and during this step the decoder gets a piece of information (e.g. a text character "c") to embed. The exemplary embodiment shows the information as text character information, however, any information the decoder can display or otherwise process can be embedded. In Step 30 the encoder reads a block of audio data samples, shown as x_i. In the preferred embodiment, the data samples are frequency domain MP3 compressed audio samples. The present invention however, is not limited to MP3 compressed audio files (samples) but applies to compressed audio files in general. Step 30 also shows, as an example, the reading of a frame. It is well known in the art that an MP3 bitstream comprises frames of compressed data. It is also known there may be more than one audio channel, e.g. stereo, with each channel storing independent samples.

The method of the present invention can also be applied to embed different information in each channel.

Proceeding to Step 40, the encoder determines whether the maximum value of the audio sample in the block exceeds a threshold value. The threshold value has been determined to be a value below which the embedding of data would unacceptably degrade the audio quality for a user. If the threshold value has not been exceeded by the maximum value of the audio sample, then the method jumps back to Step 30. If the threshold has been exceeded, then in Step 50 the encoder modifies the least significant bits (LSB's) of a subset of said block, wherein a digital representation of the information (shown as text character "c" in FIG. 1) is encoded. Preferably, the subset is a block of 16 samples, as shown in Step 50 {x_k through x_k 15}; where k=mod (i_max,16). In Step 60, a determination is made as to whether the maximum of the modified block samples (shown as x_i_max) exceeds the threshold, shown as "thr". If the threshold is exceeded, embedding has been successful and there is a branch to Step 20. If the threshold is not exceeded then two is added to the digital value of the modified sample to exceed said threshold. The value two is chosen because it's the smallest value that can be added to a number without changing the least significant bit of the binary representation, however the current invention is not limited to this value. Then the process returns to Step 20 for the encoding of the next character.

Figure 2:
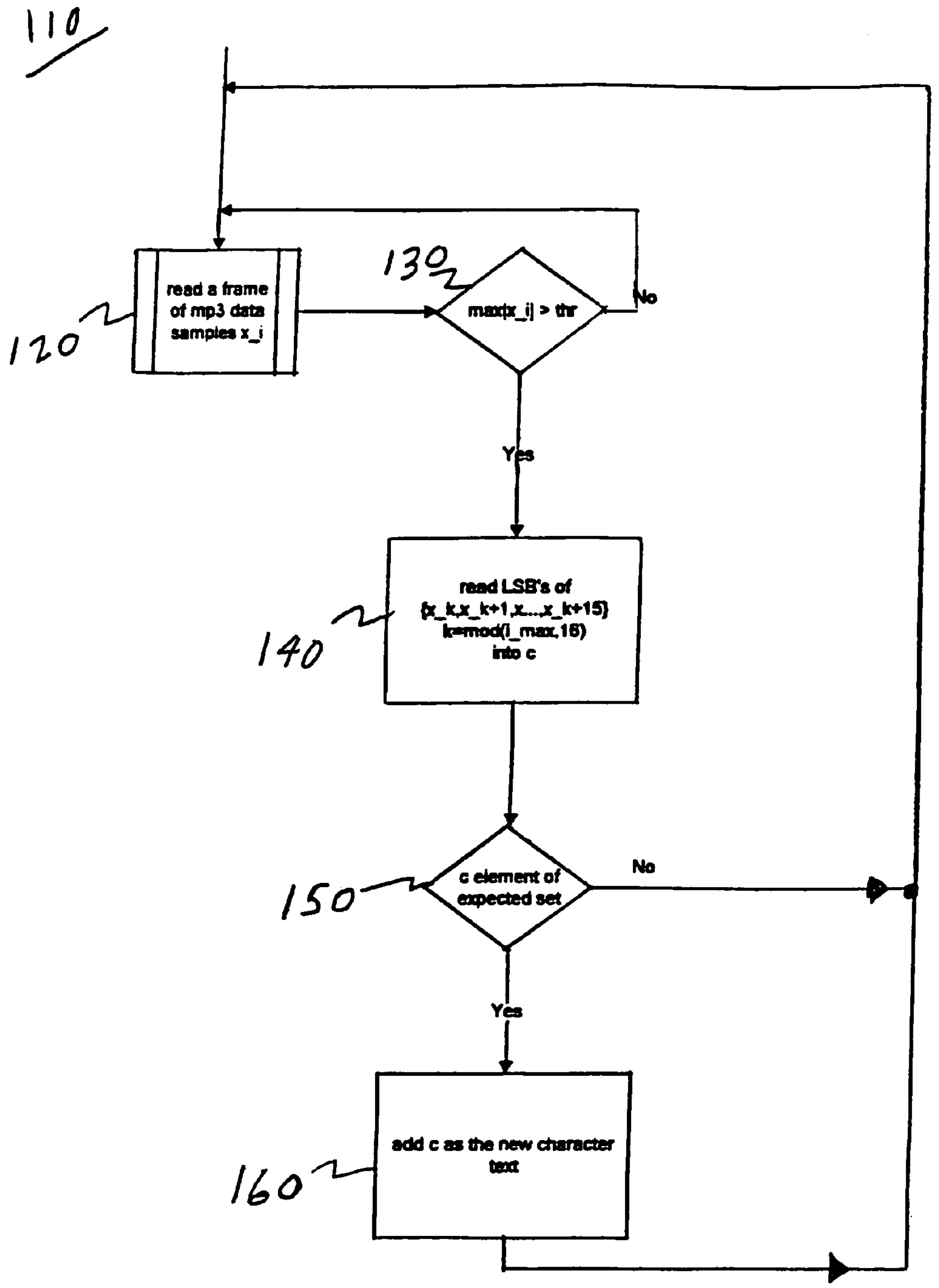
FIG. 2 is a flow chart illustrating an exemplary embodiment of the process steps of the decoder algorithm according to an exemplary embodiment of the present invention.

FIG. 2 is a flow chart illustrating the process steps of the decoder algorithm 110 according to an exemplary embodiment of the present invention. This method decodes information (shown as text character "c" for the exemplary embodiment) that was encoded in the encoding method of which an exemplary embodiment is as shown in FIG. 1. In Step 120 the decoder reads a block of encoded audio data samples. Proceeding to Step 130, a determination is made as to whether the maximum value of the encoded audio sample in the block exceeds a threshold value wherein a maximum value above the threshold indicates that no text characters were embedded. If the threshold is not exceeded, then the process returns to Step 120. If the threshold is exceeded, then Step 140 is performed wherein the decoder reads the least significant bits (LSB's) of a subset of the encoded block, wherein a digital data code is decoded. In Step 150, the decoder determines whether the decoded digital data code represents valid information (shown as "c" in FIG. 2) wherein the decoded information is found in an expected set. Expected set can be chosen in a manner suitable for the desired application. It is also possible that some applications do not require limiting the embedded information to an expected set. For example, an ASCII character set is an example of an expected set, though the present invention is not limited to ASCII characters. If the decoded information is not in the expected set, then the process proceeds back to Step 120. If the decoded information is in the expected set, then Step 160 is performed wherein the decoded valid information (e.g. character "c" in Step 160) is added as new information, and the process then proceeds back to Step 120.

While the present invention has been particularly described with respect to the illustrated embodiment, it will be appreciated that various alterations, modifications and adaptations may be made based on the present disclosure, and are intended to be within the scope of the present invention. While the invention has been described in connection with what is presently considered to be the most practical and preferred embodiments, it is to be understood that the present invention is not limited to the disclosed embodiments but, on the contrary, is intended to cover various modifications and equivalent arrangements included within the scope of the appended claims.

What is claimed is:

1. A method for encoding non-audio information with a compressed audio stream, comprising the steps of:

(1) receiving a compressed audio stream;

(2) selecting non-audio data to embed in said audio stream;

(3) identifying at least one modifiable block within said audio stream, said modifiable block having an audio sample that exceeds an audio quality threshold value; and (4) modifying a portion of said modifiable block in said compressed audio stream to encode therein at least a corresponding portion of said non-audio data at a selected point in the audio stream such that said portion of said non-audio data is reproducible by a decoder at a selected time interval along with the audio within said compressed audio stream.

2. The method of claim 1, wherein said compressed audio stream is an MP3 compliant stream.

3. The method of claim 1, wherein said non-audio data is a document file.

4. The method of claim 1, wherein said non-audio data is an Internet address.

5. The method of claim 1, wherein timing information is embedded along with said non-audio data and said timing information determines said selected point in the audio stream.

6. A method for encoding non-audio information into a compressed audio file, comprising the steps of:

(a) Getting a subset of non-audio data to embed;

(b) Reading a block of audio data samples, (c) Determining whether the maximum value of said audio sample in said block exceeds a threshold value below which the embedding of data would unacceptably degrade the audio quality for a user;

(d) Repeating step (b) if said threshold is not exceeded;

(e) Modifying the least significant bits of a subset of said block, wherein a digital representation of said non-audio information is encoded;

(f) Determining whether the maximum of said modified block exceeds said threshold;

(g) If said threshold is not exceeded then adding a small amount to the audio sample with maximum value;

(h) Continuing with step (a).

7. A method for decoding embedded non-audio information from an encoded digital audio file, comprising the steps of:

(a) Reading a block of encoded audio data samples;

(b) Determining whether the maximum value of said encoded audio sample in said block exceeds a threshold value wherein a maximum value below said threshold indicates that no non-audio information was embedded;

(c) Repeating step (a) if said threshold is not exceeded;

(d) Reading the least significant bits of a subset of said encoded block, wherein a digital data code is decoded;

(e) Determining whether the decoded digital data code represents a valid non-audio information; wherein said valid non-audio information is found in an expected set;

(f) Repeating step (a) if said decoded digital data character code is not in said expected set;

(g) Adding said decoded valid non-audio information as the new non-audio information.

8. The method of claim 7, comprising step (i) wherein said decoded non-audio information is displayed to a user.

9. The method of claim 8, comprising step (j) wherein said decoder links said user to an Internet document determined by a URL formed by said decoded non-audio information.

10. The method of claim 7, comprising step (i) wherein said decoder links said user to an Internet document determined by an address formed by said decoded embedded non-audio information.

11. The method of claim 6, wherein said audio samples are represented in frequency domain.

12. A method for encoding non-audio information with a compressed audio file, comprising the steps of:

(1) receiving a non compressed or compressed audio file;

(2) receiving at least one non-audio data stream;

(3) identifying at least one modifiable block within said non compressed or compressed audio file, said modifiable block including an audio sample having a maximum value exceeding an audio quality threshold value; and (4) modifying a portion of at least one said modifiable block of said audio file to encode therein each said non-audio data stream at a selected point in the audio stream such that each said non-audio data stream is reproducible by a decoder at a selected time interval along with the audio within said audio file.

* * * * *